US011363445B2

United States Patent
Chikkala et al.

(10) Patent No.: US 11,363,445 B2
(45) Date of Patent: Jun. 14, 2022

(54) RECOVERY TECHNIQUES FOR SUBSCRIBER IDENTIFICATION MODULE DETECTION ERROR

(71) Applicant: QUALCOMM Incorporated, San Diego, CA (US)

(72) Inventors: Venkata Durga Vinod Chikkala, Hyderabad (IN); Naga Chandan Babu Gudivada, Hyderabad (IN); Sharda Ranjan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/951,691

(22) Filed: Nov. 18, 2020

(65) Prior Publication Data

US 2022/0159447 A1 May 19, 2022

(51) Int. Cl.
*H04W 8/18* (2009.01)
*H04W 88/06* (2009.01)
*H04B 1/3816* (2015.01)
*H04W 8/20* (2009.01)

(52) U.S. Cl.
CPC .......... *H04W 8/183* (2013.01); *H04B 1/3816* (2013.01); *H04W 8/205* (2013.01); *H04W 88/06* (2013.01)

(58) Field of Classification Search
CPC . H04W 88/06; H04W 48/18; H04W 72/0453; H04W 52/146; H04W 72/042; H04W 4/40; H04W 52/367; H04W 60/00; H04W 76/14; H04W 72/14; H04W 74/0833; H04W 76/15; H04W 12/08; H04W 52/365; H04W 24/08; H04W 72/0413; H04W 72/1273; H04W 8/183; H04W 24/10; H04W 48/04

USPC .......................................................... 455/558
See application file for complete search history.

(56) References Cited

U.S. PATENT DOCUMENTS

2002/0142753 A1* 10/2002 Pecen .................... H04W 8/24
455/411
2020/0396714 A1* 12/2020 Lee ................... H04W 52/0229

FOREIGN PATENT DOCUMENTS

| CN | 109067416 A | 12/2018 |
|---|---|---|
| EP | 2648109 A1 | 10/2013 |
| EP | 2942716 A1 | 11/2015 |

OTHER PUBLICATIONS

International Search Report and Written Opinion—PCT/US2021/055642—ISA/EPO—dated Feb. 9, 2022.

* cited by examiner

*Primary Examiner* — Ajibola A Akinyemi
(74) *Attorney, Agent, or Firm* — Holland & Hart LLP

(57) ABSTRACT

Methods, systems, and devices for recovery techniques for subscriber identification module (SIM) detection error are described. A user equipment (UE) may determine an operating mode for the UE based on a SIM card switch occasion. The SIM card switch occasion may be a "hotswap" occasion of a SIM card while the UE is powered on. The UE may power a SIM card associated with the UE based on the operating mode for the UE and a previous status of a SIM slot associated with the UE. The UE may detect a presence of the SIM card in the SIM slot based on powering the SIM card. The UE may set a SIM sensing operation at the UE based on the detected presence of the SIM card.

18 Claims, 8 Drawing Sheets

RECOVERY TECHNIQUES FOR SUBSCRIBER IDENTIFICATION MODULE DETECTION ERROR

FIELD OF DISCLOSURE

The following relates to wireless communications, including recovery techniques for subscriber identification module (SIM) detection error.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some UEs may be equipped with one or multiple subscriber identification module (SIM) cards for establishing network connections. In some cases, defective hardware components such as a faulty SIM card receptacle or a faulty SIM card receptacle sensing mechanism may erroneously indicate the presence or removal of a SIM card.

SUMMARY

The described techniques relate to improved methods, systems, devices, and apparatuses that support recovery techniques for subscriber identification module (SIM) detection error. A user equipment (UE) may determine an operating mode for the UE based on a SIM card switch occasion. The SIM card switch occasion may be, for example, a "hotswap" occasion of a SIM card (e.g., removal of a SIM card and insertion of another SIM card while the UE is powered on). In some aspects, the UE may determine the operating mode for the UE based on a network occasion at the UE. For example, the UE may determine the operating mode for the UE based on a network occasion, in which the UE transitions from an inactive network connection to an active network connection (e.g., an "airplane mode" toggle). Accordingly, the operating mode may be a recovery mode triggered based on the SIM card switch occasion. In some aspects, the operating mode may be a recovery mode triggered based on the network occasion.

Based on the operating mode, the UE may power a SIM card. For example, the UE may power a general purpose input-output (GPIO) interface for powering the SIM card. In some aspects, the UE may select a powering sequence for powering the SIM card based on a set of criteria. The UE may detect a presence of the SIM card based on powering the SIM card (e.g., powering the GPIO interface for powering the SIM card). Based on the detected presence of the SIM card, the UE may set a SIM sensing operation at the UE. For example, according to the SIM sensing operation, when detecting for the SIM card, the UE (e.g., a modem SIM driver of the UE) may or may not ignore a SIM detection voltage associated with detecting the SIM card. In some examples, setting the SIM sensing operation may include enabling or disabling the SIM sensing operation.

A method of wireless communication at a UE is described. The method may include determining an operating mode for the UE based on a SIM card switch occasion, powering a SIM card associated with the UE based on the operating mode for the UE and a previous status of a SIM slot associated with the UE, detecting a presence of the SIM card in the SIM slot based on powering the SIM card, and setting a SIM sensing operation at the UE based on the detected presence of the SIM card.

An apparatus for wireless communication is described. The apparatus may include a processor, memory coupled with the processor, and instructions stored in the memory. The instructions may be executable by the processor to cause the apparatus to determine an operating mode for the apparatus based on a SIM card switch occasion, power a SIM card associated with the apparatus based on the operating mode for the apparatus and a previous status of a SIM slot associated with the apparatus, detect a presence of the SIM card in the SIM slot based on powering the SIM card, and set a SIM sensing operation at the apparatus based on the detected presence of the SIM card.

Another apparatus for wireless communication is described. The apparatus may include means for determining an operating mode for the apparatus based on a SIM card switch occasion, means for powering a SIM card associated with the apparatus based on the operating mode for the apparatus and a previous status of a SIM slot associated with the apparatus, means for detecting a presence of the SIM card in the SIM slot based on powering the SIM card, and means for setting a SIM sensing operation at the apparatus based on the detected presence of the SIM card.

A non-transitory computer-readable medium storing code for wireless communication at a UE is described. The code may include instructions executable by a processor to determine an operating mode for the UE based on a SIM card switch occasion, power a SIM card associated with the UE based on the operating mode for the UE and a previous status of a SIM slot associated with the UE, detect a presence of the SIM card in the SIM slot based on powering the SIM card, and set a SIM sensing operation at the UE based on the detected presence of the SIM card.

Some examples of the method, apparatuses, and non-transitory computer-readable medium described herein may further include operations, features, means, or instructions for determining a powering sequence based on the previous status of the SIM slot associated with the UE, the previous status indicating an absence of the SIM card in the SIM slot, where powering the SIM card associated with the UE may be based on the powering sequence.

Some examples of the method, apparatuses, and non-transitory computer-readable medium described herein may further include operations, features, means, or instructions for determining a change in a status of at least one GPIO interface of a set of GPIO interfaces associated with the UE based on one or more test signals, and determining a powering sequence based on the change in the status of the at least one GPIO interface, where powering the SIM card associated with the UE may be based on the powering sequence.

Some examples of the method, apparatuses, and non-transitory computer-readable medium described herein may further include operations, features, means, or instructions for determining the change in the status of the at least one GPIO interface may be based on a periodicity.

Some examples of the method, apparatuses, and non-transitory computer-readable medium described herein may further include operations, features, means, or instructions for determining a characteristic of the UE, where the periodicity may be based on the characteristic of the UE.

Some examples of the method, apparatuses, and non-transitory computer-readable medium described herein may further include operations, features, means, or instructions for determining a quantity of SIM card switch occasions over a temporal period, and determining the quantity of SIM card switch occasions satisfies a threshold, where the periodicity may be based on the quantity of SIM card switch occasions satisfying the threshold.

Some examples of the method, apparatuses, and non-transitory computer-readable medium described herein may further include operations, features, means, or instructions for writing a first set of values associated with the at least one GPIO interface, reading a second set of values associated with the at least one GPIO interface based on writing the first set of values, and comparing the first set of values to the second set of values, where determining the change in the status of the at least one GPIO interface may be based on a difference between the first set of values and the second set of values.

Some examples of the method, apparatuses, and non-transitory computer-readable medium described herein may further include operations, features, means, or instructions for determining the first set of values may be different from the second set of values based on comparing the first set of values to the second set of values, and determining an absence in the change in the status based on determining that the first set of values may be different from the second set of values, where determining the powering sequence includes selecting a default powering sequence based on determining the absence in the change in the status, where powering the SIM card is based on the default powering sequence.

Some examples of the method, apparatuses, and non-transitory computer-readable medium described herein may further include operations, features, means, or instructions for determining a network occasion including an active network connection or an inactive network connection, where determining the operating mode for the UE may be based on the network occasion.

Some examples of the method, apparatuses, and non-transitory computer-readable medium described herein may further include operations, features, means, or instructions for determining that the network occasion may be based on a network signal strength satisfying a threshold, where determining the operating mode for the UE may be based on the determined network signal strength satisfying the threshold.

Some examples of the method, apparatuses, and non-transitory computer-readable medium described herein may further include operations, features, means, or instructions for determining a powering sequence based on the operating mode for the UE, where powering the SIM card associated with the UE may be based on the powering sequence.

Some examples of the method, apparatuses, and non-transitory computer-readable medium described herein may further include operations, features, means, or instructions for identifying a presence or an absence of the SIM card in the SIM slot based on a sensing mechanism associated with the SIM slot, where determining the powering sequence may be based on the presence or the absence of the SIM card at the UE.

DETAILED DESCRIPTION

Figure 1:
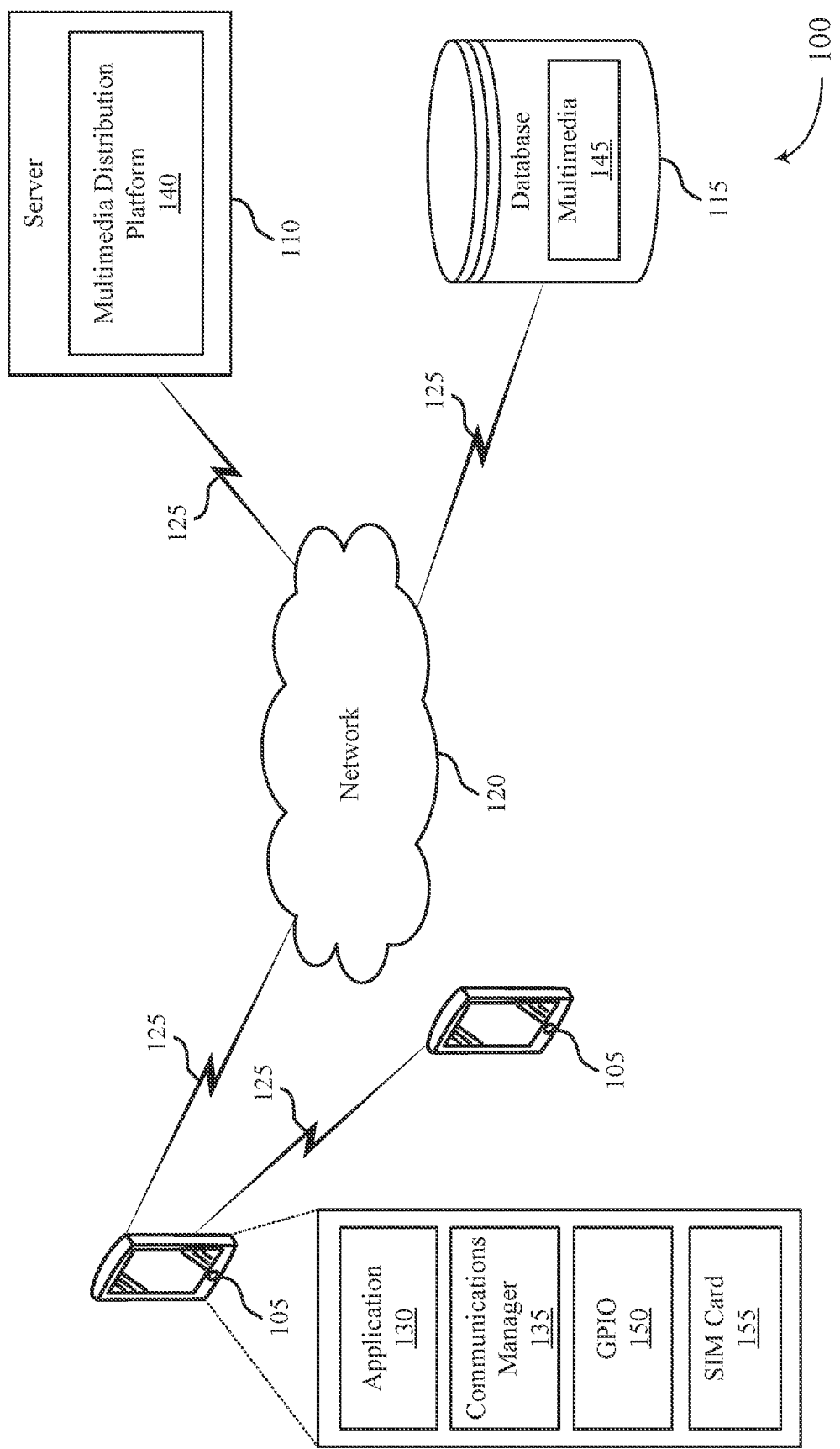
FIG. 1 illustrates an example of a wireless communications system that supports recovery techniques for subscriber identification module (SIM) detection error in accordance with aspects of the present disclosure.

Some user equipment (UEs) may be equipped with one or multiple subscriber identification module (SIM) cards for establishing one or more network connections. In some cases, defective hardware components such as a faulty SIM card receptacle or a faulty SIM card receptacle sensing mechanism (e.g., a physical coil, spring) may erroneously indicate the presence or removal of a SIM card at the UEs. For example, when an operator (user) removes a SIM card receptacle (and accordingly, a SIM card), the SIM card receptacle sensing mechanism may be fixed in a position that erroneously indicates that the SIM card is still equipped. As a result, the SIM card receptacle sensing mechanism may remain in a state indicating a presence of the SIM card (e.g., a "high" state) even though no SIM card or SIM card receptacle is present. Accordingly, the UE may thereby be unable to correctly assess a presence of a SIM card. For example, the UE may be unable to correctly determine whether a SIM card or SIM card receptacle has been removed or another SIM card has been inserted.

Some techniques for resolving erroneous indication of the presence or absence of a SIM card (e.g., SIM recovery) may include manually triggering a network occasion at a UE. In some cases, manually triggering a network occasion may include transitioning a UE from an inactive network connection to an active network connection (e.g., toggling an "airplane mode" off) as an opportunity for SIM recovery. An airplane mode may be referred to as an aeroplane mode, flight mode, offline mode, or standalone mode associated with the UE, which, when activated, may suspend radio-frequency (RF) signal transmission technologies (e.g., Bluetooth, telephony and Wi-Fi) at the UE, effectively disabling all voice, text and phone services. According to some techniques, at every manual triggering of a network occasion (e.g., toggling of the "airplane mode" off), if a present SIM card status indicates the presence of a SIM card at a SIM card slot, a UE may issue a poll command to detect for the presence of the same SIM card according to the expected state. In some examples, a modem of the UE may issue the poll command. In some cases, the UE (e.g., modem) may perform the same check (e.g., issue the same poll command) for all hardware supported SIM card slots of the UE.

In some cases, if the polling result of a SIM card slot indicates a state which deviates from an expected SIM card response, the UE may perform SIM recovery operations. The SIM recovery operations may, for example, emulate card a removal flow followed by a subsequent card detection procedure. In some other cases, if the polling result of a SIM card slot indicates a state which matches an expected SIM card response, the UE may refrain from performing the SIM recovery operations. Accordingly, at every manual triggering of a network occasion (e.g., toggling of the "airplane mode" off), some UEs may perform polling operations to detect for state mismatches (e.g., a state which fails to match an expected SIM card response). Based on detected state mismatches, some UEs may thereby infer that a SIM card has been removed or a SIM card has been inserted (e.g., via a hotswap). In some UEs, the operations for the SIM recovery may be enabled or disabled by device level programs stored in non-volatile memory of the UEs.

Some techniques for SIM recovery for some UEs may be dependent on an assumption that an operator (user) will initiate operations for SIM recovery. In some cases, such techniques may be dependent on an assumption that the operator (user) will attempt to manually trigger a network occasion (e.g., toggle the "airplane mode" off) for initiating SIM recovery. Improved techniques for SIM recovery and accurate SIM detection are desired. Various aspects of the disclosure relate to configuring a UE to determine an operating mode for the UE based on a SIM card switch occasion. The SIM card switch occasion may be, for example, a hotswap occasion of a SIM card (e.g., removal of a SIM card and insertion of another SIM card while the UE is powered on). In some aspects, the UE may determine the operating mode for the UE based on a network occasion at the UE. For example, the UE may determine the operating mode for the UE based on a network occasion in which the UE transitions from an inactive network connection to an active network connection (e.g., an "airplane mode" toggle). Accordingly, the operating mode may be a recovery mode triggered based on the SIM card switch occasion. In some aspects, the operating mode may be a recovery mode triggered based on the network occasion.

Based on the operating mode, the UE may power a SIM card. In some aspects, the UE may select a powering sequence for powering the SIM card based on a set of criteria. In some examples, the UE may power a general purpose input-output (GPIO) interface for powering the SIM card. In some examples, the UE may periodically test the GPIO by applying test signals to the GPIO (e.g., writing test values to the GPIO) and determining whether the test signals are accurately reflected by the GPIO (e.g., reading output values at the GPIO and determining whether the output values satisfy a condition or threshold). The UE may detect a presence of a SIM card based on powering the SIM card (e.g., based on powering the GPIO interface for powering the SIM card). Based on the detected presence of the SIM card, the UE may set a SIM sensing operation at the UE. For example, according to the SIM sensing operation, when detecting for the SIM card, the UE (e.g., a modem SIM driver of the UE) may or may not ignore a SIM detection voltage associated with detecting the SIM card. In some examples, setting the SIM sensing operation may include enabling or disabling the SIM sensing operation.

Aspects of the disclosure are initially described in the context of a multimedia system. Examples of processes and devices illustrating aspects of the discussed techniques are then described. Aspects of the disclosure are further illustrated by and described with reference to apparatus diagrams, system diagrams, and flowcharts that relate to recovery techniques for SIM detection error.

FIG. 1 illustrates a wireless communication system 100 for a device 105 that supports techniques for recovery techniques for SIM detection error in accordance with aspects of the present disclosure. The wireless communication system 100 may include devices 105, a server 110, and a database 115. Although, the wireless communication system 100 illustrates two devices 105, a single server 110, a single database 115, and a single network 120, the present disclosure applies to any wireless communication system architecture having one or more devices 105, servers 110, databases 115, and networks 120. The devices 105, the server 110, and the database 115 may communicate with each other and exchange information that supports recovery techniques for SIM detection error, such as packets, data, or control information, via network 120 using communications links 125. In some cases, a portion or all of the techniques described herein supporting recovery techniques for SIM detection error may be performed by the devices 105 or the server 110, or both.

A device 105 may be a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to wireless communication (e.g., transmitting, receiving, broadcasting, streaming, sinking, capturing, storing, and recording data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., wireless communication-related information).

The devices 105 may include an application 130, a communications manager 135, a GPIO 150, and a SIM card 155 (e.g., one or more SIM cards 155). While, the wireless communication system 100 illustrates the devices 105 including both the application 130 and the communications manager 135. In some cases, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The communications manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like.

The GPIO 150 may include interfaces (e.g., IO pins) having hotswap capability. For example, the IO pins of the GPIO 155 may provide a high impedance drive mode even when the GPIO 150 is not powered. The IO pins of the GPIO 155 may be electrically coupled to the SIM card 155. The device 105 may power the SIM card 155 via the IO pins (also referred to herein as GPIO interfaces) of the GPIO 155. The SIM card 155 may be associated with establishing connections based on a respective radio access technology (RAT), telecommunications operator, or subscription. In some aspects, the SIM card 155 may be an eUICC (Embedded Universal Integrated Circuit Card) capable of being remotely configured or provisioned with SIM profiles via over-the-air communications. In some aspects, the device 105 may include multiple SIM cards 155. In some examples, the device 105 may include one or more SIM slots for equipping a respective SIM card 155 at the device 105.

The device 105 may determine an operating mode for the device 105 based on a SIM card switch occasion. The SIM card switch occasion may be, for example, a "hotswap" occasion of a SIM card 155 (e.g., removal of a SIM card 155 and insertion of another SIM card 155 while the device 105 is powered on). In some aspects, the device 105 may determine the operating mode for the device 105 based on a network occasion at the device 105. For example, the device 105 may determine the operating mode for the device 105 based on a network occasion in which the device 105 transitions from an inactive network connection to an active network connection (e.g., an "airplane mode" toggle). Accordingly, the operating mode may be a recovery mode triggered based on the SIM card switch occasion. In some aspects, the operating mode may be a recovery mode triggered based on the network occasion.

Based on the operating mode, the device 105 may power the SIM card 155. For example, the device 105 may power a GPIO interface of the GPIO 150 for powering the SIM card 155. In some aspects, the device 105 may select a powering sequence for powering the SIM card 155 based on a set of criteria, example aspects of which are described herein with reference to FIG. 2. In some examples, the device 105 may periodically test the GPIO 150 by applying test signals to the GPIO 150 (e.g., writing test values to the GPIO 150) and determining whether the test signals are accurately reflected by the GPIO 150 (e.g., reading output values at the GPIO 150). In some aspects, the device 105 may set a periodicity for testing the GPIO 150 based on a set of criteria, example aspects of which are described herein with reference to FIG. 2.

The device 105 may detect a presence of a SIM card 155 based on powering the SIM card 155 (e.g., based on powering the GPIO interface for powering the SIM card 155). Based on the detected presence of the SIM card 155, the device 105 may set a SIM sensing operation at the device 105. For example, according to the SIM sensing operation, when detecting for the SIM card 155, the device 105 (e.g., a modem SIM driver of the device 105) may or may not ignore a SIM detection voltage (also referred to herein as a SIM detection line) associated with detecting the SIM card 155. In some examples, setting the SIM sensing operation may include enabling or disabling the SIM sensing operation.

The server 110 may be a data server, a cloud server, mobile server, or any combination thereof. The server 110 may in some cases include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 145. The device may support recovery techniques for SIM detection error associated with the multimedia 145. The device 105 may retrieve the stored data from the database 115 via the network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the wireless communication system 100 may include uplink transmissions from the device 105 to the server 110 and the database 115, and/or downlink transmissions, from the server 110 and the database 115 to the device 105. The wireless communications links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

The techniques described herein may provide improvements in power savings and user experience. Furthermore, the techniques described herein may provide benefits and enhancements to the operation of the devices 105. For example, by resolving erroneous indication of the presence or absence of a SIM card (e.g., SIM recovery), the operational characteristics, such as power consumption, processor utilization (e.g., DSP, CPU, GPU, ISP processing utilization), and memory usage of the devices 105 may be reduced.

The techniques described herein may also provide efficiency to the devices 105 by improving accuracy and reducing latency associated with processes related to recovery techniques for SIM error.

Figure 2:
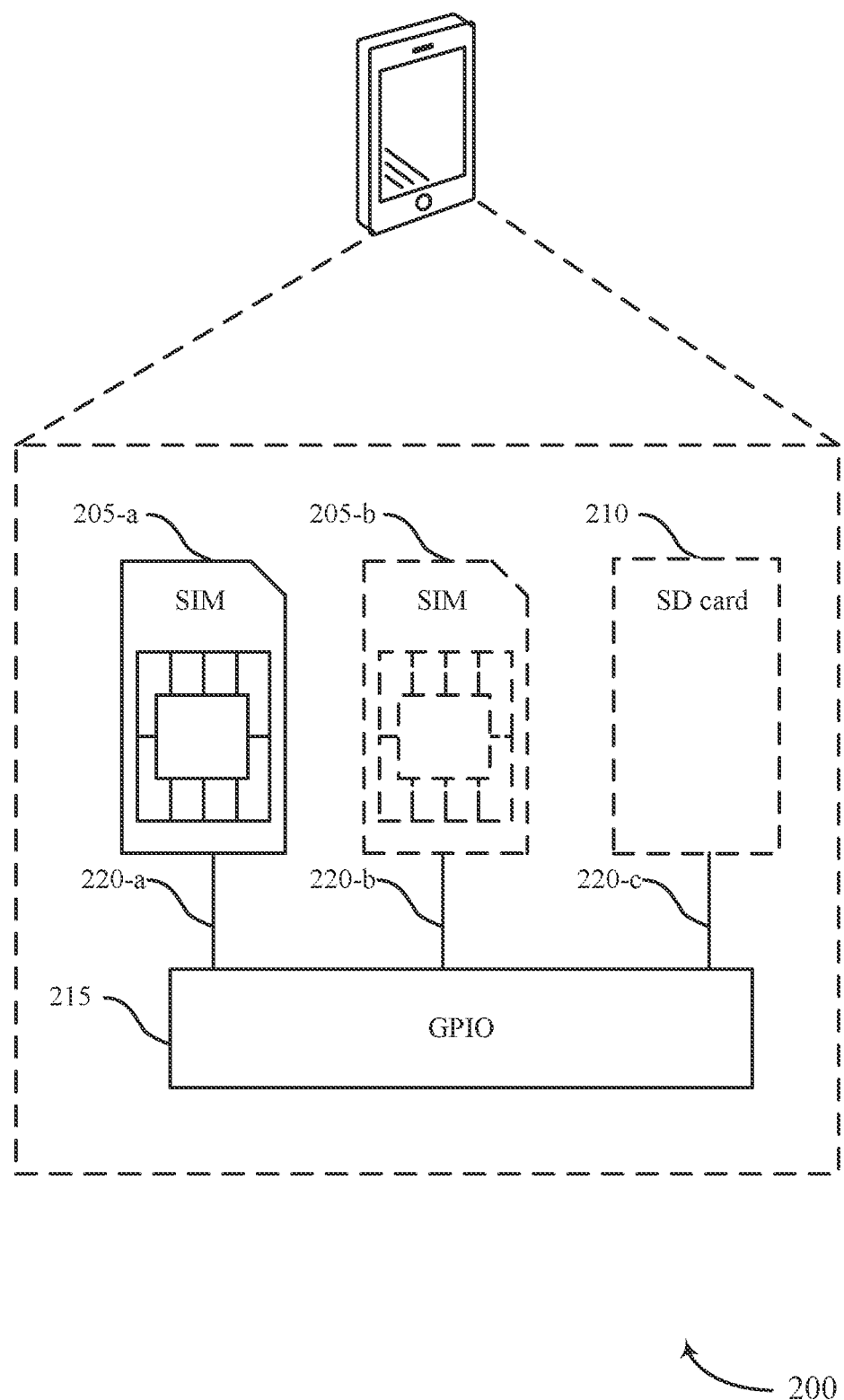
FIG. 2 illustrates an example of a device that supports recovery techniques for SIM detection error in accordance with aspects of the present disclosure.

FIG. 2 illustrates an example of a device 200 that supports recovery techniques for SIM detection error in accordance with aspects of the present disclosure. In some examples, the device 200 be an example of a UE 115 described with reference to FIG. 1. In the example of FIG. 2, the device 200 includes a SIM card 205-a, a SIM card 205-b, a secure digital (SD) memory card 210, and a GPIO 215. In some examples, the device 200 may be equipped with a single SIM card slot for equipping a single SIM card 205 (e.g., SIM card 210-a). In some other examples, the device 200 may be equipped with a multiple card slots. For example, the device 200 may be equipped with multiple SIM card slots for equipping multiple SIM cards 205 (e.g., SIM card 210-a, SIM card-a) and one or more card slots for equipping one or more secure digital (SD) cards 210. Each of the SIM card 205-a, the SIM card 205-b, and the SD memory card 210 may be equipped in a respective card slot of the device 200.

The SIM card 205-a and the SIM card 205-b may include aspects of the SIM card 155 described with reference to FIG. 1. The GPIO 215 may include multiple GPIO interfaces 220 (e.g., GPIO interface 220-a through GPIO interface 220-c). The GPIO interfaces 220 may be, for example, included in a set of 10 pins of the GPIO 215. In some examples, the device 200 may be equipped with multiple GPIOs 215. For example, the device 200 may include the GPIO 215 (e.g., associated with the SIM card 205-a and the SIM card 205-b) and another GPIO 215 (e.g., associated with a SIM card tray for equipping the SIM card 205-a and the SIM card 205-b). The GPIO 215 may include aspects of the GPIO 150 described with reference to FIG. 1.

The device 200 may determine an operating mode for the device 200 based on a SIM card switch occasion. The SIM card switch occasion may be, for example, a hotswap occasion of a SIM card 205. In some examples, the hotswap occasion may include a removal of a SIM card 205 from a SIM card slot and insertion of another SIM card 205 (or reinsertion of the same SIM card 205) into the SIM card slot while the device 200 is powered on. In some aspects, the device 200 may determine the operating mode for the device 200 based on a network occasion at the device 200. For example, the device 200 may determine the operating mode for the device 200 based on a network occasion in which the device 200 transitions from an inactive network connection to an active network connection (e.g., based on an "airplane mode" toggle). Accordingly, the operating mode may be a recovery mode triggered based on the SIM card switch occasion. In some aspects, the operating mode may be a recovery mode triggered based on the network occasion.

The device 200 may power a SIM card 205 (e.g., SIM card 205-a) based on the operating mode. In some examples, powering the SIM card 205 may include powering a GPIO interface 220 (e.g., GPIO interface 220-a) for powering the SIM card 205 (e.g., SIM card 205-a). In some aspects, the device 200 may select a powering sequence for powering the SIM card 205 (e.g., SIM card 205-a) based on a set of criteria. In some examples, the powering sequence may include outputting a set of signals to one or more GPIO interfaces 220 (e.g., IO pins) of the GPIO 215. For example, the powering sequence may include outputting a set of signals to a data GPIO interface, a clock GPIO interface, a reset GPIO interface, and a VCC GPIO interface included in the GPIO interfaces 220, according to a powering sequence. In an example, the powering sequence may include setting a voltage level at each of the data GPIO interface, the clock GPIO interface, the reset GPIO interface, and the VCC GPIO interface to a logic level "HIGH" or a logic level "LOW".

The device 200 may identify a presence or an absence of a SIM card 205 (e.g., SIM card 205-a) in a SIM slot of the device 200 based on a sensing mechanism associated with the SIM slot. The device 200 may determine (select) a powering sequence based on the presence or the absence of the SIM card at the UE. In some aspects, the device 200 may determine (select) a powering sequence without identifying for the presence or absence of the SIM card 205 (e.g., SIM card 205-a). In an example, the device 200 may determine (select) a powering sequence for a direct power-on of the SIM card 205 (e.g., SIM card 205-a), without identifying for the presence or absence of the SIM card 205 (e.g., SIM card 205-a).

In some examples, the device 200 may determine a hotswap GPIO status associated with the SIM card 205 (e.g., SIM card 205-a). The hotswap GPIO status may indicate whether a loss of network coverage occurred prior to a network occasion. For example, the hotswap GPIO status may indicate whether the loss of network coverage occurred prior to an "airplane mode" toggle associated with transitioning the device 200 from an active network connection to an inactive network connection. In some aspects, based on a hotswap GPIO status indicating that a loss of network coverage (e.g., a network signal strength failing to satisfy a threshold) occurred prior to the network occasion, the device 200 may determine that an operator (user) is attempting to recover the device 200 and the SIM card 205 (e.g., SIM card 205-a). In some examples, based on the hotswap GPIO status, the device 200 may determine (select) the powering sequence for the direct power-on of the SIM card 205 (e.g., SIM card 205-a).

The device 200 may determine (select) a powering sequence based on a previous status of a SIM slot associated with the device 200. For example, the previous status may indicate that a SIM card 205 (e.g., SIM card 205-a) was absent from the SIM slot during an active network occasion. In an example, the previous status may be a hotswap GPIO state indicating that a SIM card 205 (e.g., SIM card 205-a) was removed from the SIM slot while "airplane mode" was OFF. In some aspects, based on the previous status (e.g., hotswap GPIO state), the device 200 may determine (select) a normal powering sequence for powering the SIM card 205 (e.g., SIM card 205-a).

In some aspects, the device 200 may determine a change in a status of one or more of the GPIO interfaces 220 (e.g., one or more of the GPIO interface 220-a through the GPIO interface 220-c) based on one or more test signals. For example, the device 200 may periodically test the GPIO 215 (or multiple GPIOs 215) to determine whether test signals applied to the GPIO 215 are accurately reflected by the GPIO 215. In an example, the device 200 may enter a GPIO test mode (e.g., during hours associated with off-peak usage of the device 200 by a user), during which the device 200 may periodically write test values (e.g., a power on signal, logic level HIGH) to the GPIO 215 and read output values at the GPIO 215.

In some aspects, the device 200 may determine whether the test values are accurately reflected by the output values at a GPIO interface 220 (e.g., GPIO interface 220-a) of the GPIO 215. For example, the device 200 may determine whether the output values match the test values. The output values may be, for example, a SIM detection voltage. In an example, the device 200 may determine whether the output values satisfy SIM detection voltage satisfies a condition or threshold. In some examples, based on the test signals and the output signals, the device 200 may determine whether a change in status at the GPIO interface 220 (e.g., GPIO interface 220-a) of the GPIO 215 has occurred.

The device 200 may determine (select) a powering sequence for powering a SIM card 205 (e.g., SIM card 205-a) based on determining the change in the status of the GPIO interface 220 (e.g., GPIO interface 220-a). For example, the device 200 (e.g., the modem SIM driver of the device 200) may ignore the SIM detection voltage associated with detecting the SIM card 205 (e.g., SIM card 205-a). In some examples, the device 200 may fall back to a set of default procedures for powering up or powering down the device 200.

In some aspects, the GPIO interface 220-a through GPIO interface 220-c may be associated with (e.g., equipped at, electrically coupled to) a same card tray of the device 200. In some examples, the device 200 may determine a change in a status of a GPIO interface 220 (e.g., GPIO interface 220-a) based on one or more test signals applied to another GPIO interface 220 (e.g., GPIO interface 220-b, GPIO interface 220-c). For example, the device 200 may verify a GPIO interface 220 (e.g., GPIO interface 220-a) based on one or more test signals applied to the other GPIO interface 220 (e.g., GPIO interface 220-b, GPIO interface 220-c). In an example, the device 200 may determine whether signals will be accurately reflected at the GPIO interface 220 (e.g., GPIO interface 220-a), based on whether test signals applied to the other GPIO interface 220 (e.g., GPIO interface 220-b) are accurately reflected by output values at the other GPIO interface 220 (e.g., GPIO interface 220-b). For example, based on verifying the other GPIO interface 220 (e.g., GPIO interface 220-b), the device 200 may verify the GPIO interface 220 (e.g., GPIO interface 220-a).

In some examples, the device 200 may determine that test signals are accurately reflected by the output values at the GPIO interface 220-b, and the device 200 may assume that the SIM detection voltage associated with detecting the SIM card 205-b is valid. Based on the association between the GPIO interface 220-a and the GPIO interface 220-b (e.g., due to the SIM card 205-a and the SIM card 205-b being equipped at or electrically coupled to the same card tray of the device 200), the device 200 may infer or assume that the SIM detection voltage associated with detecting the SIM card 205-a at the GPIO interface 220-a is also valid.

In some other examples, the device 200 may determine that test signals are not accurately reflected by the output values at the GPIO interface 220-b, and the device 200 may assume that the SIM detection voltage associated with detecting the SIM card 205-b is invalid. Based on the association between the GPIO interface 220-a and the GPIO interface 220-b (e.g., due to the SIM card 205-a and the SIM card 205-b being equipped at or electrically coupled to the same card tray of the device 200), the device 200 may infer or assume that the SIM detection voltage associated with detecting the SIM card 205-a at the GPIO interface 220-a is also invalid.

In another example, the device 200 may determine whether test signals are accurately or inaccurately reflected by output values at the GPIO interface 220-c. Based on the determination, the device 200 may assume a detection voltage associated with detecting the SD card 210 is valid or invalid. In some aspects, based on the association between the GPIO interface 220-a and the GPIO interface 220-c (e.g., due to the SIM card 205-a and the SD card 210 being equipped at or electrically coupled to the same card tray of the device 200), the device 200 may infer or assume that the SIM detection voltage associated with detecting the SIM card 205-a at the GPIO interface 220-a is also valid or invalid.

In some aspects, the device 200 may set a periodicity for testing the GPIO 215. For example, the device 200 may set a periodicity for determining a change in a status of a GPIO interface 220 (e.g., GPIO interface 220-a) of the GPIO 215. For example, the device 200 may set the periodicity based on a set of criteria. In some aspects, the criteria may include a characteristic of the device 200, such as device age or a usage profile. In an example, the device 200 may adjust the periodicity for testing the GPIO 215 based on the device age of the device 200. For example, the device 200 may increase the periodicity based on an increased device age of the device 200.

In another example, the device 200 may adjust the periodicity based on a quantity of SIM card switch occasions at the device 200 over a temporal period. For example, the device 200 may adjust the periodicity based on a total quantity of SIM card switch occasions at the device 200 with respect to a duration (e.g., a lifetime) of the device 200. In another example, the device 200 may determine that the total quantity of SIM card switch occasions satisfies a threshold (e.g., a mechanical limitation of a SIM card slot or SIM card tray the device 200). In some aspects, the device 200 may set the periodicity to zero (e.g., disable testing of the GPIO 215, disable checking the hotswap GPIO status) based on determining that the total quantity of SIM card switch occasions (e.g., 500 SIM card switch occasions) exceeds the threshold.

The device 200 may detect a presence of a SIM card 205 (e.g., SIM card 205-a) based on powering the SIM card 205 (e.g., SIM card 205-a) according to the power sequences as described herein. For example, the device 200 may detect a presence of the SIM card 205-a based on powering a GPIO interface 220 (e.g., GPIO interface 220-a through GPIO interface 220-c) for powering the SIM card 205-a. As described herein, based on the detected presence of the SIM card 205 (e.g., SIM card 205-a), the device 200 may set a SIM sensing operation at the device 200. For example, according to the SIM sensing operation, when detecting for the SIM card 205 (e.g., SIM card 205-a), the device 200 (e.g., a modem SIM driver of the device 200) may or may not ignore a SIM detection voltage associated with detecting the SIM card 205. Setting the SIM sensing operation may include enabling or disabling the SIM sensing operation.

Figure 3:
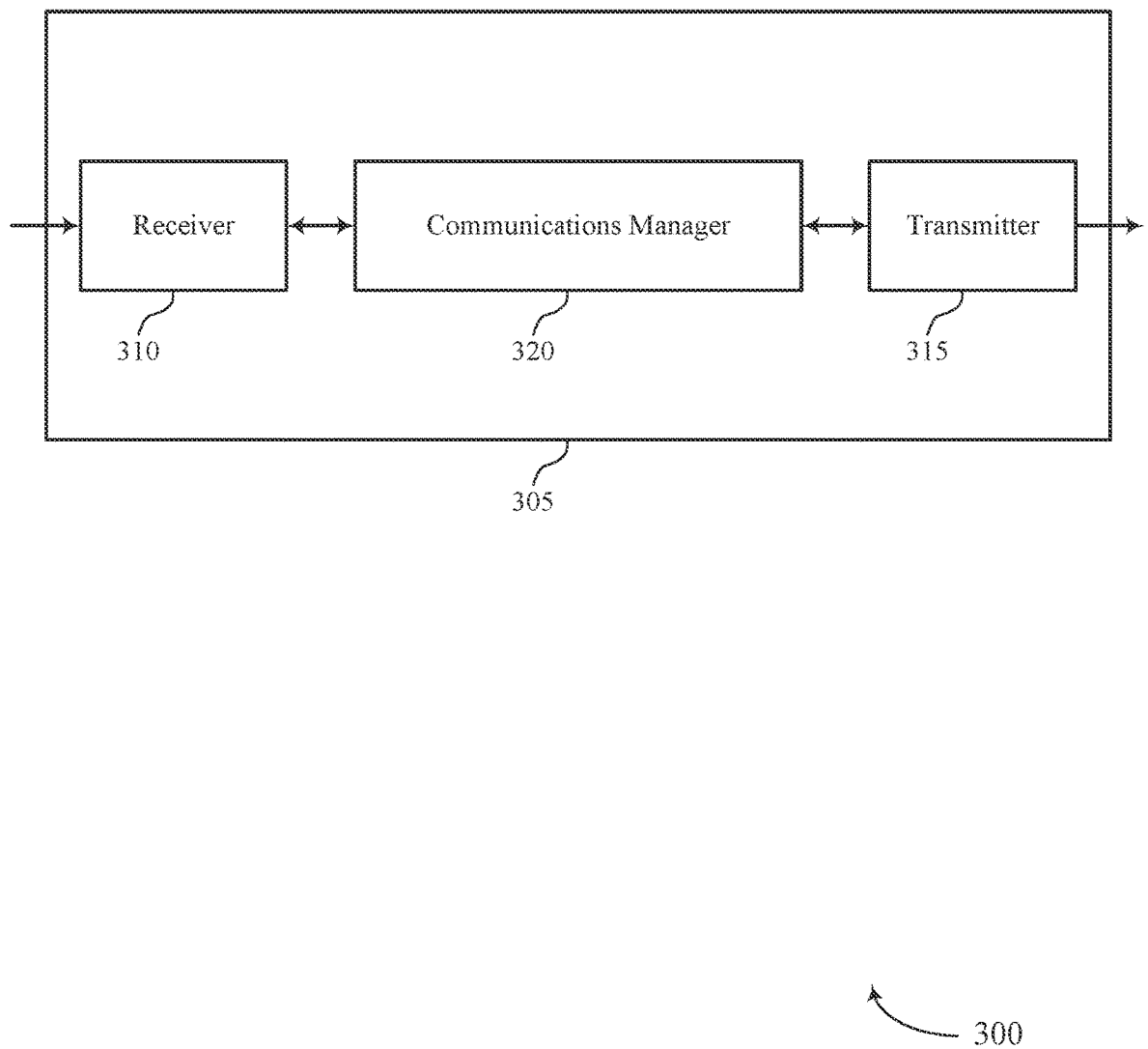
FIGS. 3 and 4 show block diagrams of devices that support recovery techniques for SIM detection error in accordance with aspects of the present disclosure.

FIG. 3 shows a block diagram 300 of a device 305 that supports recovery techniques for SIM detection error in accordance with aspects of the present disclosure. The device 305 may be an example of aspects of a UE 115 as described herein. The device 305 may include a receiver 310, a transmitter 315, and a communications manager 320. The device 305 may also include a processor. Each of these components may be in communication with one another (e.g., via one or more buses).

The receiver 310 may provide a means for receiving information such as packets, user data, control information, or any combination thereof associated with various information channels (e.g., control channels, data channels, information channels related to recovery techniques for SIM detection error). Information may be passed on to other components of the device 305. The receiver 310 may utilize a single antenna or a set of multiple antennas.

The transmitter 315 may provide a means for transmitting signals generated by other components of the device 305. For example, the transmitter 315 may transmit information such as packets, user data, control information, or any combination thereof associated with various information channels (e.g., control channels, data channels, information channels related to recovery techniques for SIM detection error). In some examples, the transmitter 315 may be co-located with a receiver 310 in a transceiver component. The transmitter 315 may utilize a single antenna or a set of multiple antennas.

The communications manager 320, the receiver 310, the transmitter 315, or various combinations thereof or various components thereof may be examples of means for performing various aspects of recovery techniques for SIM detection error as described herein. For example, the communications manager 320, the receiver 310, the transmitter 315, or various combinations or components thereof may support a method for performing one or more of the functions described herein. In some examples, the communications manager 320, the receiver 310, the transmitter 315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, the communications manager 320, the receiver 310, the transmitter 315, or various combinations or components thereof may be implemented in code (e.g., as communications management software or firmware) executed by a processor. If implemented in code executed by a processor, the functions of the communications manager 320, the receiver 310, the transmitter 315, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

The communications manager 320 may be configured to perform various operations (e.g., receiving, monitoring, transmitting) using or otherwise in cooperation with the receiver 310, the transmitter 315, or both. For example, the communications manager 320 may receive information from the receiver 310, send information to the transmitter 315, or be integrated in combination with the receiver 310, the transmitter 315, or both to receive information, transmit information, or perform various other operations as described herein. The communications manager 320 may also support wireless communication at the device 305 in accordance with examples as disclosed herein.

For example, the communications manager 320 may be configured as or otherwise support a means for determining an operating mode for the device 305 based on a SIM card switch occasion. The communications manager 320 may be configured as or otherwise support a means for powering a SIM card associated with the device 305 based on the operating mode for the device 305 and a previous status of a SIM slot associated with the device 305. The communications manager 320 may be configured as or otherwise support a means for detecting a presence of the SIM card in the SIM slot based on powering the SIM card. The communications manager 320 may be configured as or otherwise support a means for setting a SIM sensing operation at the device 305 based on the detected presence of the SIM card.

By including or configuring the communications manager 320 in accordance with examples as described herein, the device 305 (e.g., a processor controlling or otherwise coupled to the receiver 310, the transmitter 315, the communications manager 320, or a combination thereof) may support techniques for detecting the presence or absence of a SIM card (e.g., SIM recovery) as well as improving accuracy and reducing latency associated with processes related to recovery techniques for SIM error. Accordingly, the supported techniques may support improved reliability, reduced power consumption, and more efficient utilization of processing resources of the device 305.

Figure 4:
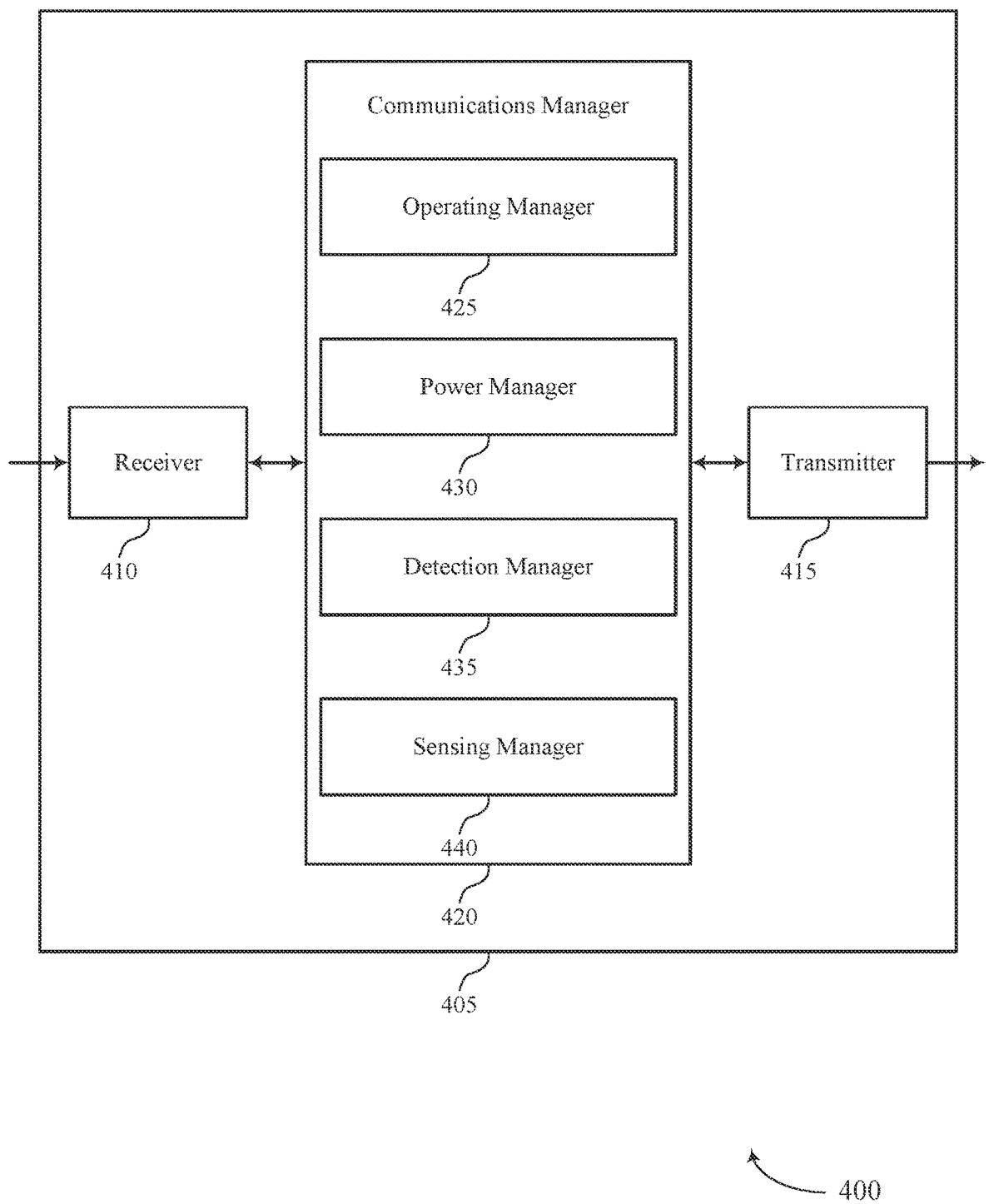

FIG. 4 shows a block diagram 400 of a device 405 that supports recovery techniques for SIM detection error in accordance with aspects of the present disclosure. The device 405 may be an example of aspects of a device 305 or a UE 115 as described herein. The device 405 may include a receiver 410, a transmitter 415, and a communications manager 420. The device 405 may also include a processor. Each of these managers may be in communication with one another (e.g., via one or more buses).

The receiver 410 may provide a means for receiving information such as packets, user data, control information, or any combination thereof associated with various information channels (e.g., control channels, data channels, information channels related to recovery techniques for SIM detection error). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to recovery techniques for SIM detection error). In some examples, the transmitter 415 may be co-located with a receiver 410 in a transceiver component. The transmitter 415 may utilize a single antenna or a set of multiple antennas.

The device 405, or various components thereof, may be an example of means for performing various aspects of recovery techniques for SIM detection error as described herein. For example, the communications manager 420 may include an operating manager 425, a power manager 430, a detection manager 435, a sensing manager 440, or any combination thereof. The communications manager 420 may be an example of aspects of a communications manager 320 as described herein. In some examples, the communications manager 420, or various components thereof, may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. The operating manager 425 may be configured as or otherwise support a means for determining an operating mode for the UE based on a SIM card switch occasion. The power manager 430 may be configured as or otherwise support a means for powering a SIM card associated with the UE based on the operating mode for the UE and a previous status of a SIM slot associated with the UE. The detection manager 435 may be configured as or otherwise support a means for detecting a presence of the SIM card in the SIM slot based on powering the SIM card. The sensing manager 440 may be configured as or otherwise support a means for setting a SIM sensing operation at the UE based on the detected presence of the SIM card.

Figure 5:
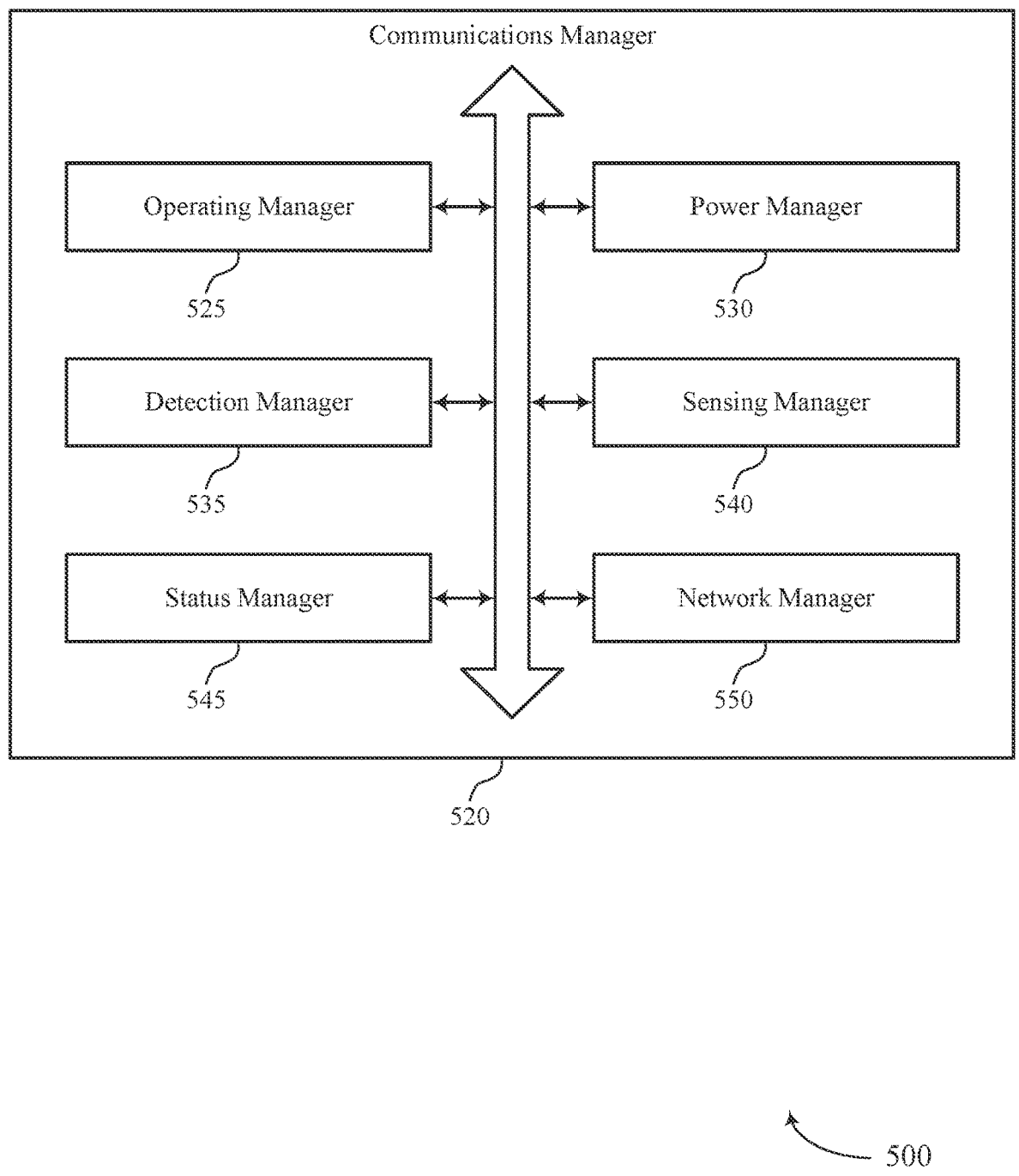
FIG. 5 shows a block diagram of a communications manager that supports recovery techniques for SIM detection error in accordance with aspects of the present disclosure.

FIG. 5 shows a block diagram 500 of a communications manager 520 that supports recovery techniques for SIM detection error in accordance with aspects of the present disclosure. The communications manager 520 may be an example of aspects of a communications manager 320, a communications manager 420, or both, as described herein. The communications manager 520, or various components thereof, may be an example of means for performing various aspects of recovery techniques for SIM detection error as described herein. For example, the communications manager 520 may include an operating manager 525, a power manager 530, a detection manager 535, a sensing manager 540, a status manager 545, a network manager 550, or any combination thereof. Each of these managers may communicate, directly or indirectly, with one another (e.g., via one or more buses).

The communications manager 520 may support wireless communication at a UE in accordance with examples as disclosed herein. The operating manager 525 may be configured as or otherwise support a means for determining an operating mode for the UE based on a SIM card switch occasion. The power manager 530 may be configured as or otherwise support a means for powering a SIM card associated with the UE based on the operating mode for the UE and a previous status of a SIM slot associated with the UE. The detection manager 535 may be configured as or otherwise support a means for detecting a presence of the SIM card in the SIM slot based on powering the SIM card. The sensing manager 540 may be configured as or otherwise support a means for setting a SIM sensing operation at the UE based on the detected presence of the SIM card. In some examples, the power manager 530 may be configured as or otherwise support a means for determining a powering sequence based on the previous status of the SIM slot associated with the UE, the previous status indicating an absence of the SIM card in the SIM slot, where powering the SIM card associated with the UE is based on the powering sequence.

The status manager 545 may be configured as or otherwise support a means for determining a change in a status of at least one GPIO interface of a set of GPIO interfaces associated with the UE based on one or more test signals. In some examples, the power manager 530 may be configured as or otherwise support a means for determining a powering sequence based on the change in the status of the at least one GPIO interface, where powering the SIM card associated with the UE is based on the powering sequence. In some examples, determining the change in the status of the at least one GPIO interface is based on a periodicity.

In some examples, the status manager 545 may be configured as or otherwise support a means for determining a characteristic of the UE, where the periodicity is based on the characteristic of the UE. In some examples, the status manager 545 may be configured as or otherwise support a means for determining a quantity of SIM card switch occasions over a temporal period. In some examples, the status manager 545 may be configured as or otherwise support a means for determining the quantity of SIM card switch occasions satisfies a threshold, where the periodicity is based on the quantity of SIM card switch occasions satisfying the threshold.

The status manager 545 may be configured as or otherwise support a means for writing a first set of values associated with the at least one GPIO interface. In some examples, the status manager 545 may be configured as or otherwise support a means for reading a second set of values associated with the at least one GPIO interface based on writing the first set of values. In some examples, the status manager 545 may be configured as or otherwise support a means for comparing the first set of values to the second set of values, where determining the change in the status of the at least one GPIO interface is based on a difference between the first set of values and the second set of values.

In some examples, the status manager 545 may be configured as or otherwise support a means for determining the first set of values are different from the second set of values based on comparing the first set of values to the second set of values. In some examples, the status manager 545 may be configured as or otherwise support a means for determining an absence in the change in the status based on determining that the first set of values are different from the second set of values. In some examples, to determine the powering sequence, the power manager 530 may be configured as or otherwise support a means for selecting a default powering sequence based on determining the absence in the change in the status, where powering the SIM card is based on the default powering sequence.

The network manager 550 may be configured as or otherwise support a means for determining a network occasion including an active network connection or an inactive network connection, where determining the operating mode for the UE is based on the network occasion. In some examples, the network manager 550 may be configured as or otherwise support a means for determining that the network occasion is based on a network signal strength satisfying a threshold, where determining the operating mode for the UE is based on the determined network signal strength satisfying the threshold. In some examples, the power manager 530 may be configured as or otherwise support a means for determining a powering sequence based on the operating mode for the UE, where powering the SIM card associated with the UE is based on the powering sequence. In some examples, the detection manager 535 may be configured as or otherwise support a means for identifying a presence or an absence of the SIM card in the SIM slot based on a sensing mechanism associated with the SIM slot, where determining the powering sequence is based on the presence or the absence of the SIM card at the UE.

Figure 6:
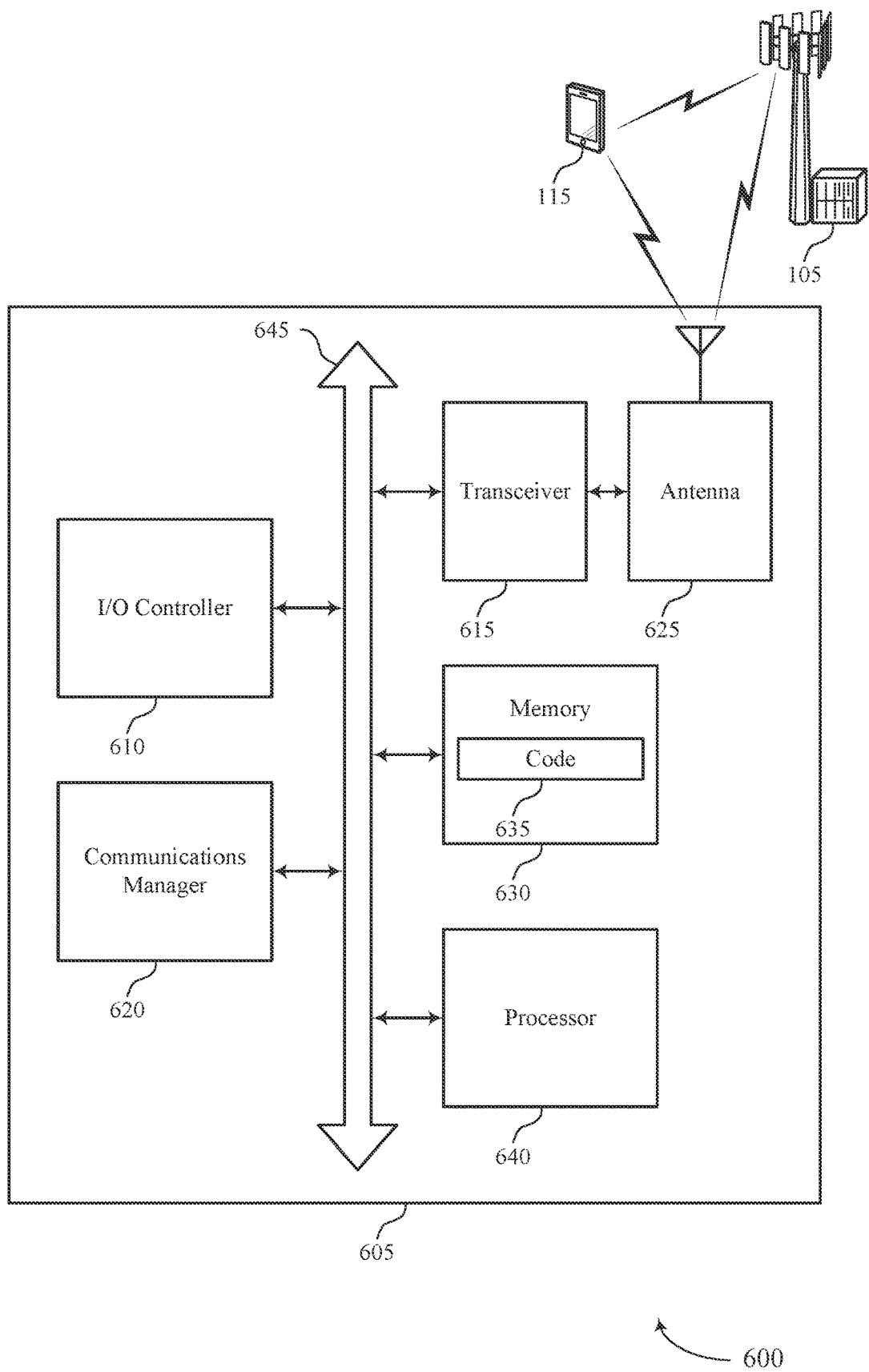
FIG. 6 shows a diagram of a system including a device that supports recovery techniques for SIM detection error in accordance with aspects of the present disclosure.

FIG. 6 shows a diagram of a system 600 including a device 605 that supports recovery techniques for SIM detection error in accordance with aspects of the present disclosure. The device 605 may be an example of or include the components of a device 305, a device 405, or a UE 115 as described herein. The device 605 may communicate wirelessly with one or more base stations 105, UEs 115, or any combination thereof. The device 605 may include components for bi-directional voice and data communications including components for transmitting and receiving communications, such as a communications manager 620, an input/output (I/O) controller 610, a transceiver 615, an antenna 625, a memory 630, code 635, and a processor 640. These components may be in electronic communication or otherwise coupled (e.g., operatively, communicatively, functionally, electronically, electrically) via one or more buses (e.g., a bus 645).

The I/O controller 610 may manage input and output signals for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. Additionally or alternatively, the I/O controller 610 may represent or interact with a modem, a keyboard, a mouse, a touchscreen, or a similar device. In some cases, the I/O controller 610 may be implemented as part of a processor, such as the processor 640. In some cases, a user may interact with the device 605 via the I/O controller 610 or via hardware components controlled by the I/O controller 610.

The device 605 may include a single antenna 625. However, in some cases, the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 may also include a modem to modulate the packets, to provide the modulated packets to one or more antennas 625 for transmission, and to demodulate packets received from the one or more antennas 625. The transceiver 615, or the transceiver 615 and one or more antennas 625, may be an example of a transmitter 315, a transmitter 415, a receiver 310, a receiver 410, or any combination thereof or component thereof, as described herein.

The memory 630 may include random access memory (RAM) and read-only memory (ROM). The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some cases, the code 635 may not be directly executable by the processor 640 but may cause a computer (e.g., when compiled and executed) to perform functions described herein. In some cases, the memory 630 may contain, among other things, a basic I/O system (BIOS) which may control basic hardware or software operation such as the interaction with peripheral components or devices.

The processor 640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In some other cases, a memory controller may be integrated into the processor 640. The processor 640 may be configured to execute computer-readable instructions stored in a memory (e.g., the memory 630) to cause the device 605 to perform various functions (e.g., functions or tasks supporting recovery techniques for SIM detection error). For example, the device 605 or a component of the device 605 may include a processor 640 and memory 630 coupled to the processor 640, the processor 640 and memory 630 configured to perform various functions described herein.

The communications manager 620 may support wireless communication at the device 605 in accordance with examples as disclosed herein. For example, the communications manager 620 may be configured as or otherwise support a means for determining an operating mode for the device 605 based on a SIM card switch occasion. The communications manager 620 may be configured as or otherwise support a means for powering a SIM card associated with the device 605 based on the operating mode for the device 605 and a previous status of a SIM slot associated with the device 605. The communications manager 620 may be configured as or otherwise support a means for detecting a presence of the SIM card in the SIM slot based on powering the SIM card. The communications manager 620 may be configured as or otherwise support a means for setting a SIM sensing operation at the device 605 based on the detected presence of the SIM card. By including or configuring the communications manager 620 in accordance with examples as described herein, the device 605 may support techniques for reduced latency with respect to establishing or re-establishing a network connection based on a card switch occasion, improved user experience related to a reduced reliance on a user input associated with establishing or re-establishing the network connection, reduced power consumption, and improved utilization of processing resources.

The communications manager 620 may be configured to perform various operations (e.g., receiving, monitoring, transmitting) using or otherwise in cooperation with the transceiver 615, the one or more antennas 625, or any combination thereof. Although the communications manager 620 is illustrated as a separate component, in some examples, one or more functions described with reference to the communications manager 620 may be supported by or performed by the processor 640, the memory 630, the code 635, or any combination thereof. For example, the code 635 may include instructions executable by the processor 640 to cause the device 605 to perform various aspects of recovery techniques for SIM detection error as described herein, or the processor 640 and the memory 630 may be otherwise configured to perform or support such operations.

Figure 7:
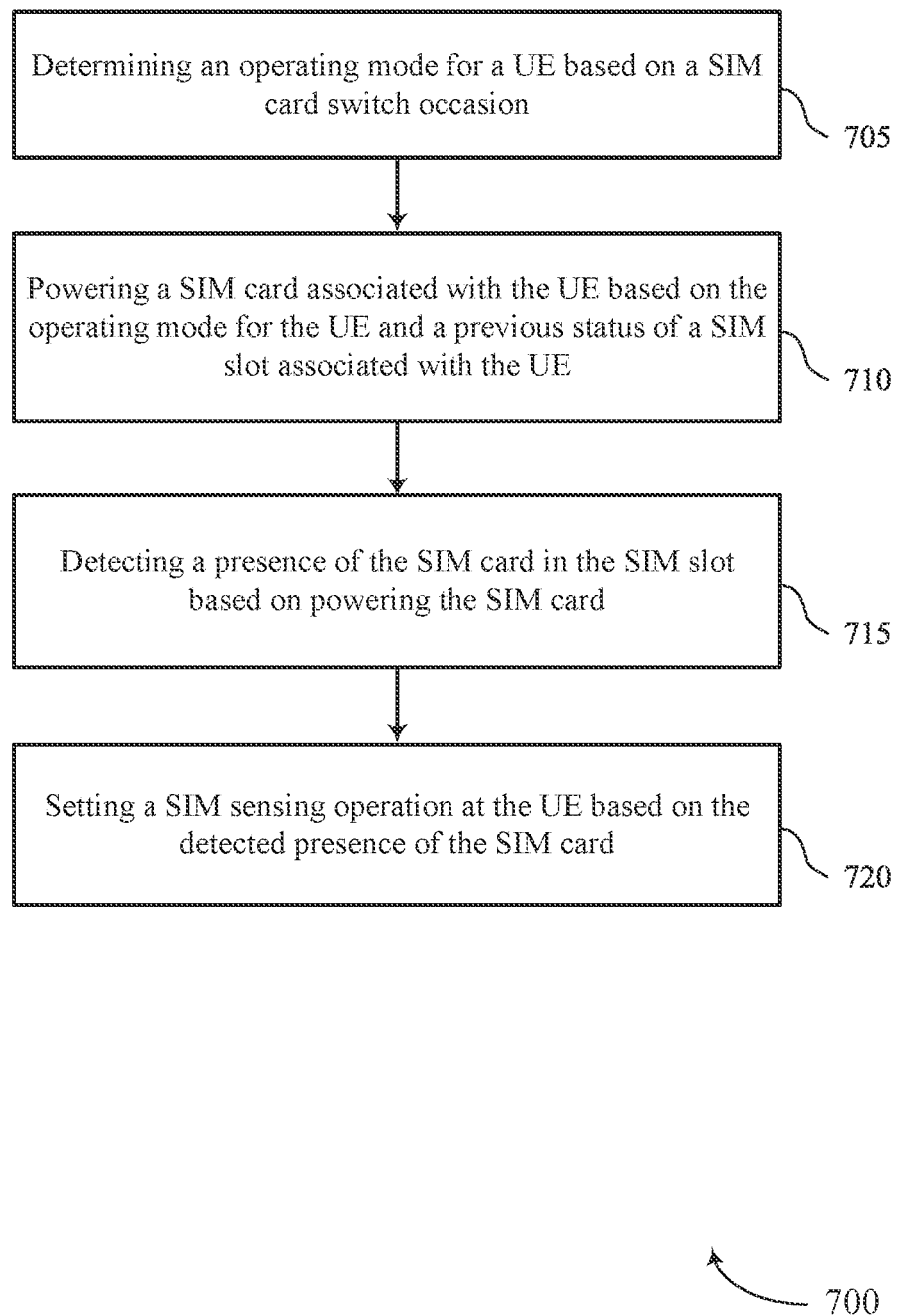
FIGS. 7 and 8 show flowcharts illustrating methods that support recovery techniques for SIM detection error in accordance with aspects of the present disclosure.

FIG. 7 shows a flowchart illustrating a method 700 that supports recovery techniques for SIM detection error in accordance with aspects of the present disclosure. The operations of the method 700 may be implemented by a UE or its components as described herein. For example, the operations of the method 700 may be performed by a UE as described with reference to FIGS. 1 through 6. In some examples, a UE may execute a set of instructions to control the functional elements of the UE to perform the described functions. Additionally or alternatively, the UE may perform aspects of the described functions using special-purpose hardware.

At 705, the method 700 may include determining an operating mode for a UE based on a SIM card switch occasion. The operations of 705 may be performed in accordance with examples as disclosed herein. In some examples, aspects of the operations of 705 may be performed by an operating manager 525 as described with reference to FIG. 5.

At 710, the method 700 may include powering a SIM card associated with the UE based on the operating mode for the UE and a previous status of a SIM slot associated with the UE. The operations of 710 may be performed in accordance with examples as disclosed herein. In some examples, aspects of the operations of 710 may be performed by a power manager 530 as described with reference to FIG. 5.

At 715, the method 700 may include detecting a presence of the SIM card in the SIM slot based on powering the SIM card. The operations of 715 may be performed in accordance with examples as disclosed herein. In some examples, aspects of the operations of 715 may be performed by a detection manager 535 as described with reference to FIG. 5.

At 720, the method 700 may include setting a SIM sensing operation at the UE based on the detected presence of the SIM card. The operations of 720 may be performed in accordance with examples as disclosed herein. In some examples, aspects of the operations of 720 may be performed by a sensing manager 540 as described with reference to FIG. 5.

Figure 8:
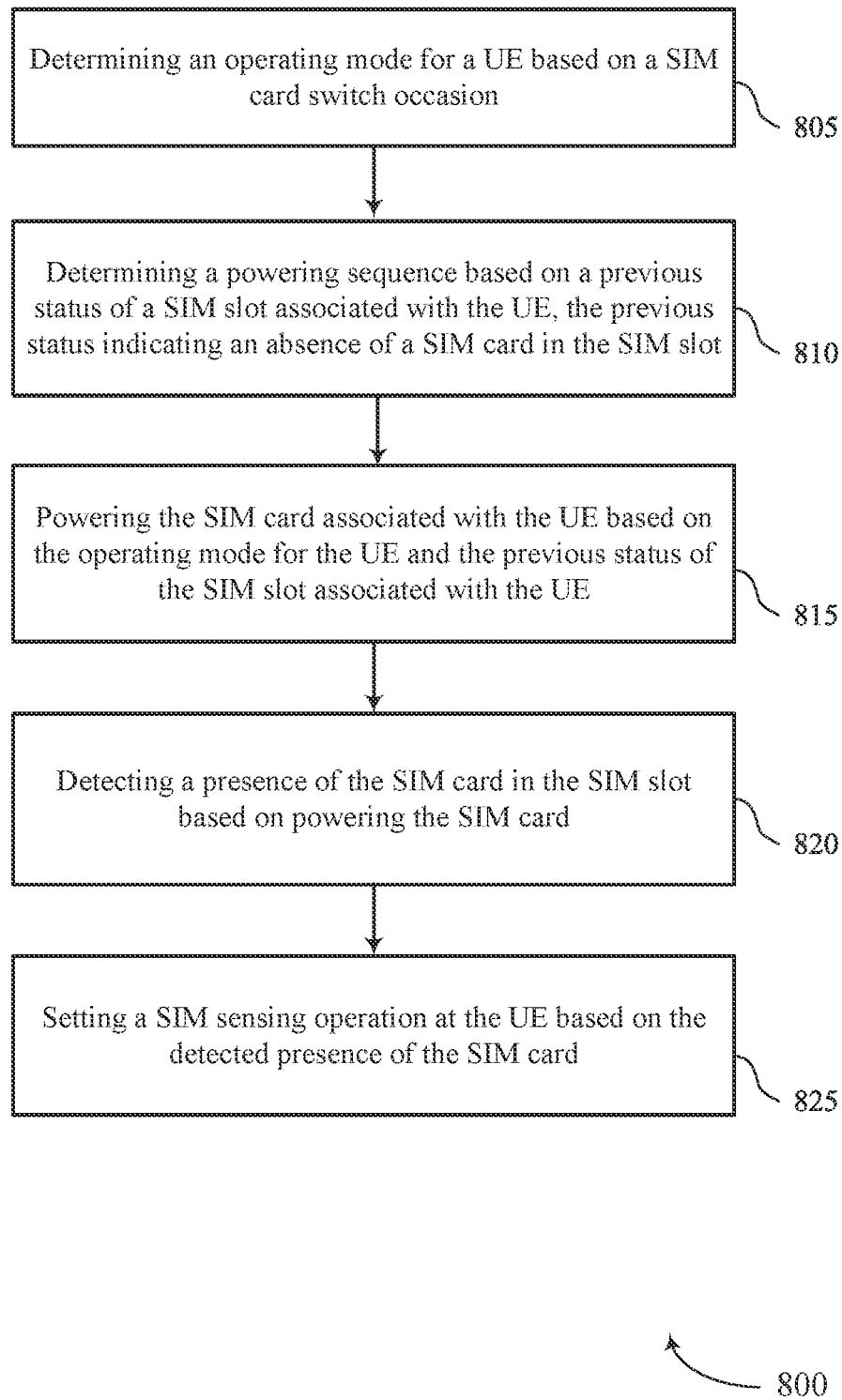

FIG. 8 shows a flowchart illustrating a method 800 that supports recovery techniques for SIM detection error in accordance with aspects of the present disclosure. The operations of the method 800 may be implemented by a UE or its components as described herein. For example, the operations of the method 800 may be performed by a UE as described with reference to FIGS. 1 through 6. In some examples, a UE may execute a set of instructions to control the functional elements of the UE to perform the described functions. Additionally or alternatively, the UE may perform aspects of the described functions using special-purpose hardware.

At 805, the method 800 may include determining an operating mode for a UE based on a SIM card switch occasion. The operations of 805 may be performed in accordance with examples as disclosed herein. In some examples, aspects of the operations of 805 may be performed by an operating manager 525 as described with reference to FIG. 5.

At 810, the method 800 may include determining a powering sequence based on a previous status of a SIM slot associated with the UE, the previous status indicating an absence of a SIM card in the SIM slot. The operations of 810 may be performed in accordance with examples as disclosed herein. In some examples, aspects of the operations of 810 may be performed by a power manager 530 as described with reference to FIG. 5.

At 815, the method 800 may include powering the SIM card associated with the UE based on the operating mode for the UE and the previous status of the SIM slot associated with the UE. In some aspects, powering the SIM card associated with the UE is based on the powering sequence. The operations of 815 may be performed in accordance with examples as disclosed herein. In some examples, aspects of the operations of 815 may be performed by a detection manager 535 as described with reference to FIG. 5.

At 820, the method 800 may include detecting a presence of the SIM card in the SIM slot based on powering the SIM card. The operations of 820 may be performed in accordance with examples as disclosed herein. In some examples, aspects of the operations of 820 may be performed by a sensing manager 540 as described with reference to FIG. 5.

At 825, the method 800 may include setting a SIM sensing operation at the UE based on the detected presence of the SIM card. The operations of 825 may be performed in accordance with examples as disclosed herein. In some examples, aspects of the operations of 825 may be performed by a power manager 530 as described with reference to FIG. 5.

The following provides an overview of aspects of the present disclosure:

Aspect 1: A method for wireless communication at a UE, comprising: determining an operating mode for the UE based at least in part on a SIM card switch occasion; powering a SIM card associated with the UE based at least in part on the operating mode for the UE and a previous status of a SIM slot associated with the UE; detecting a presence of the SIM card in the SIM slot based at least in part on powering the SIM card; and setting a SIM sensing operation at the UE based at least in part on the detected presence of the SIM card.

Aspect 2: The method of aspect 1, further comprising: determining a powering sequence based at least in part on the previous status of the SIM slot associated with the UE, the previous status indicating an absence of the SIM card in the SIM slot, wherein powering the SIM card associated with the UE is based at least in part on the powering sequence.

Aspect 3: The method of any of aspects 1 through 2, further comprising: determining a change in a status of at least one GPIO interface of a set of GPIO interfaces associated with the UE based at least in part on one or more test signals; and determining a powering sequence based at least in part on the change in the status of the at least one GPIO interface, wherein powering the SIM card associated with the UE is based at least in part on the powering sequence.

Aspect 4: The method of aspect 3, wherein determining the change in the status of the at least one GPIO interface is based at least in part on a periodicity.

Aspect 5: The method of aspect 4, further comprising: determining a characteristic of the UE, wherein the periodicity is based at least in part on the characteristic of the UE.

Aspect 6: The method of any of aspects 4 through 5, further comprising: determining a quantity of SIM card switch occasions over a temporal period; and determining the quantity of SIM card switch occasions satisfies a threshold, wherein the periodicity is based at least in part on the quantity of SIM card switch occasions satisfying the threshold.

Aspect 7: The method of any of aspects 3 through 6, further comprising: writing a first set of values associated with the at least one GPIO interface; reading a second set of values associated with the at least one GPIO interface based at least in part on writing the first set of values; and comparing the first set of values to the second set of values, wherein determining the change in the status of the at least one GPIO interface is based at least in part on a difference between the first set of values and the second set of values.

Aspect 8: The method of aspect 7, further comprising: determining the first set of values are different from the second set of values based at least in part on comparing the first set of values to the second set of values; and determining an absence in the change in the status based at least in part on determining that the first set of values are different from the second set of values, wherein determining the powering sequence comprises: selecting a default powering sequence based at least in part on determining the absence in the change in the status, wherein powering the SIM card is based at least in part on the default powering sequence.

Aspect 9: The method of any of aspects 1 through 8, further comprising: determining a network occasion comprising an active network connection or an inactive network connection, wherein determining the operating mode for the UE is based at least in part on the network occasion.

Aspect 10: The method of aspect 9, further comprising: determining that the network occasion is based at least in part on a network signal strength satisfying a threshold, wherein determining the operating mode for the UE is based at least in part on the determined network signal strength satisfying the threshold.

Aspect 11: The method of any of aspects 1 through 10, further comprising: determining a powering sequence based at least in part on the operating mode for the UE, wherein powering the SIM card associated with the UE is based at least in part on the powering sequence.

Aspect 12: The method of aspect 11, further comprising: identifying a presence or an absence of the SIM card in the SIM slot based at least in part on a sensing mechanism associated with the SIM slot, wherein determining the powering sequence is based at least in part on the presence or the absence of the SIM card at the UE.

Aspect 13: An apparatus for wireless communication, comprising a processor; memory coupled with the processor; and instructions stored in the memory and executable by the processor to cause the apparatus to perform a method of any of aspects 1 through 12.

Aspect 14: An apparatus for wireless communication, comprising at least one means for performing a method of any of aspects 1 through 12.

Aspect 15: A non-transitory computer-readable medium storing code for wireless communication at a UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining an operating mode for the UE based at least in part on a subscriber identification module card switch occasion;
   determining a change in a status of at least one general purpose input-output interface of a set of general purpose input-output interfaces associated with the UE based at least in part on one or more test signals;
   determining a powering sequence based at least in part on the change in the status of the at least one general purpose input-output interface;
   powering a subscriber identification module card associated with the UE based at least in part on the operating mode for the UE, the powering sequence, and a previous status of a subscriber identification module slot associated with the UE;
   detecting a presence of the subscriber identification module card in the subscriber identification module slot based at least in part on powering the subscriber identification module card; and
   setting a subscriber identification module sensing operation at the UE based at least in part on the detected presence of the subscriber identification module card.

2. The method of claim 1, further comprising:
   determining the powering sequence based at least in part on the previous status of the subscriber identification module slot associated with the UE, the previous status indicating an absence of the subscriber identification module card in the subscriber identification module slot,
   wherein powering the subscriber identification module card associated with the UE is further based at least in part on the powering sequence.

3. The method of claim 1, wherein determining the change in the status of the at least one general purpose input-output interface is based at least in part on a periodicity.

4. The method of claim 3, further comprising:
   determining a characteristic of the UE, wherein the periodicity is based at least in part on the characteristic of the UE.

5. The method of claim 3, further comprising:
   determining a quantity of subscriber identification module card switch occasions over a temporal period; and
   determining the quantity of subscriber identification module card switch occasions satisfies a threshold, wherein the periodicity is based at least in part on the quantity of subscriber identification module card switch occasions satisfying the threshold.

6. The method of claim 1, further comprising:
   writing a first set of values associated with the at least one general purpose input-output interface;
   reading a second set of values associated with the at least one general purpose input-output interface based at least in part on writing the first set of values; and
   comparing the first set of values to the second set of values, wherein determining the change in the status of the at least one general purpose input-output interface is based at least in part on a difference between the first set of values and the second set of values.

7. The method of claim 6, further comprising:
   determining the first set of values are different from the second set of values based at least in part on comparing the first set of values to the second set of values; and
   determining an absence in the change in the status based at least in part on determining that the first set of values are different from the second set of values, wherein determining the powering sequence comprises:
   selecting a default powering sequence based at least in part on determining the absence in the change in the status, wherein powering the subscriber identification module card is based at least in part on the default powering sequence.

8. The method of claim 1, further comprising:
   determining a network occasion comprising an active network connection or an inactive network connection, wherein determining the operating mode for the UE is based at least in part on the network occasion.

9. The method of claim 8, further comprising:
   determining that the network occasion is based at least in part on a network signal strength satisfying a threshold, wherein determining the operating mode for the UE is based at least in part on the network signal strength satisfying the threshold.

10. The method of claim 1 wherein,
    determining the powering sequence is based at least in part on the operating mode for the UE, wherein powering the subscriber identification module card associated with the UE is based at least in part on the powering sequence.

11. The method of claim 1, further comprising:
    identifying a presence or an absence of the subscriber identification module card in the subscriber identification module slot based at least in part on a sensing mechanism associated with the subscriber identification module slot, wherein determining the powering sequence is based at least in part on the presence or the absence of the subscriber identification module card at the UE.

12. An apparatus for wireless communication, comprising:
    a processor;
    memory coupled with the processor; and
    instructions stored in the memory and executable by the processor to cause the apparatus to:
    determine an operating mode for the apparatus based at least in part on a subscriber identification module card switch occasion;
    determine a change in a status of at least one general purpose input-output interface of a set of general purpose input-output interfaces associated with the apparatus based at least in part on one or more test signals;
    determine a powering sequence based at least in part on the change in the status of the at least one general purpose input-output interface;
    power a subscriber identification module card associated with the apparatus based at least in part on the operating mode for the apparatus, the powering sequence, and a previous status of a subscriber identification module slot associated with the apparatus;
    detect a presence of the subscriber identification module card in the subscriber identification module slot based at least in part on powering the subscriber identification module card; and
    set a subscriber identification module sensing operation at the apparatus based at least in part on the detected presence of the subscriber identification module card.

13. The apparatus of claim 12, wherein the instructions are further executable by the processor to cause the apparatus to:
  determine the powering sequence based at least in part on the previous status of the subscriber identification module slot associated with the apparatus, the previous status indicating an absence of the subscriber identification module card in the subscriber identification module slot,
  wherein the instructions to power the subscriber identification module card associated with the UE are further executable by the processor based at least in part on the powering sequence.

14. The apparatus of claim 12, wherein the instructions to determine the change in the status of the at least one general purpose input-output interface are further executable by the processor based at least in part on a periodicity.

15. The apparatus of claim 14, wherein the instructions are further executable by the processor to cause the apparatus to:
  determine a characteristic of the apparatus, wherein the periodicity is based at least in part on the characteristic of the apparatus.

16. The apparatus of claim 14, wherein the instructions are further executable by the processor to cause the apparatus to:
  determine a quantity of subscriber identification module card switch occasions over a temporal period; and
  determine the quantity of subscriber identification module card switch occasions satisfies a threshold, wherein the periodicity is based at least in part on the quantity of subscriber identification module card switch occasions satisfying the threshold.

17. The apparatus of claim 12, wherein the instructions are further executable by the processor to cause the apparatus to:
  write a first set of values associated with the at least one general purpose input-output interface;
  read a second set of values associated with the at least one general purpose input-output interface based at least in part on writing the first set of values; and
  compare the first set of values to the second set of values, wherein the instructions to determine the change in the status of the at least one general purpose input-output interface are further executable by the processor based at least in part on a difference between the first set of values and the second set of values.

18. An apparatus for wireless communication, comprising:
  means for determining an operating mode for the apparatus based at least in part on a subscriber identification module card switch occasion;
  means for determining a change in a status of at least one general purpose input-output interface of a set of general purpose input-output interfaces associated with the apparatus based at least in part on one or more test signals;
  means for determining a powering sequence based at least in part on the change in the status of the at least one general purpose input-output interface;
  means for powering a subscriber identification module card associated with the apparatus based at least in part on the operating mode for the apparatus, the powering sequence, and a previous status of a subscriber identification module slot associated with the apparatus;
  means for detecting a presence of the subscriber identification module card in the subscriber identification module slot based at least in part on powering the subscriber identification module card; and
  means for setting a subscriber identification module sensing operation at the apparatus based at least in part on the detected presence of the subscriber identification module card.

* * * * *